United States Patent

Kopecky et al.

[11] Patent Number: 6,061,414
[45] Date of Patent: May 9, 2000

[54] PROCESS FOR THE RENOVATION OF A NUCLEAR FUEL ASSEMBLY STORAGE RACK

[75] Inventors: Bernard Kopecky, Nantes; Jean-Paul Souchet, Carquefou, both of France

[73] Assignee: A.T.E.A. Societe Atlantique de Techniques Avancees, Carquefou Cedex, France

[21] Appl. No.: 09/120,071

[22] Filed: Jul. 21, 1998

[30] Foreign Application Priority Data

Aug. 7, 1997 [FR] France .................................. 97 10136

[51] Int. Cl.[7] .......................... G21C 19/00; G21C 19/32; G21C 19/40
[52] U.S. Cl. ...................... 376/260; 376/272; 250/506.1; 250/507.1; 250/518.1
[58] Field of Search .................................. 376/272, 260; 250/506.1, 507.1, 518.1

[56] References Cited

U.S. PATENT DOCUMENTS

| | | | |
|---|---|---|---|
| 3,838,500 | 10/1974 | Wirfelt | 29/568 |
| 4,111,490 | 9/1978 | Liesveld | 299/17 |
| 4,143,277 | 3/1979 | Krieger | 250/507 |
| 4,243,886 | 1/1981 | Untermyer, II | 250/390 |
| 4,643,845 | 2/1987 | Omote et al. | 252/626 |
| 4,746,487 | 5/1988 | Wachter | 376/272 |
| 4,788,029 | 11/1988 | Kerjean | 376/272 |
| 4,788,030 | 11/1988 | Bosshard | 376/272 |
| 5,198,183 | 3/1993 | Newman | 376/272 |
| 5,479,463 | 12/1995 | Roberts | 376/339 |

OTHER PUBLICATIONS

Boral Flux Trap Liners (advertisement for AAR Brooks & Perkins), Nucl. Eng. Int., Dec. 1988.

Primary Examiner—Charles T. Jordan
Assistant Examiner—Jack Keith
Attorney, Agent, or Firm—Pearne, Gordon, McCoy & Granger LLP

[57] ABSTRACT

Process for the renovation of a nuclear fuel assembly storage rack.

For the renovation of a nuclear fuel assembly storage rack, whereof the bulkheads (10) incorporate a neutrophage material sheet held between the partition (16) and a plate (18) welded to said partition, the plate (18) is cut, the sheet extracted and is replaced by a new neutrophage material sheet. This process obviates the need for replacing the rack when the sheets have dissolved in the water of the pool containing the rack.

13 Claims, 3 Drawing Sheets

PROCESS FOR THE RENOVATION OF A NUCLEAR FUEL ASSEMBLY STORAGE RACK

TECHNICAL FIELD

The present invention relates to a process for the renovation of a nuclear fuel assembly storage rack.

The invention more particularly applies to storage racks, where a neutrophage material is placed between the walls or partitions ensuring the separation between the cavities or cells of the rack and the plates joined by welding to said walls.

PRIOR ART

It is standard practice in the nuclear industry to store nuclear fuel assemblies in storage racks placed in pools where cooling water flows.

Such installations receive either new nuclear fuel assemblies, or nuclear fuel assemblies previously irradiated in the core of a nuclear reactor. They are located both at the site of reactors and on other sites, such as reprocessing plants.

Storage racks comprise a rigid stricture, which can be implemented in different ways, so as to define a certain number of juxtaposed cavities or cells, whose longitudinal axis is vertically oriented. Each of said cavities or cells serves to receive a nuclear fuel assembly. To this end, the cross-section of the cells is comparable to that of the assemblies, i.e. generally square.

The rigid structure of the storage racks can be implemented in different ways. Thus, the bulkheads defining the cells can e.g. be obtained, either by assembling in staggered manner tubes having a square cross-section with the aid of welded tabs, or by assembly by welding of parallel plates oriented in two orthogonal directions.

No matter what the procedure used for implementing the rigid structure of the rack, it is normal to equip the bulkheads separating the cells with a neutrophage material, which can be in various forms. The function of this neutrophage material is to absorb the neutrons emitted by the fissile matter contained in the nuclear fuel assemblies. This makes it possible to reduce to a minimum value the distance separating two neighbouring cells. The number of nuclear fuel assemblies storable in a pool of given dimensions can consequently be optimized.

One of the known methods for integrating a neutrophage material into the bulkheads separating the rack consists of placing a neutrophage material sheet between each partition of the cells and a plate joined by welding to said partition.

In such a configuration, the neutrophage material sheet can in particular be constituted by a polymer containing natural boron. Such a material is marketed under the trademark Boraflex.

Old storage racks equipped with such a neutrophage material are subject to significant signs of ageing. This ageing is caused by the dissolving of the neutrophage material in the boric acid solution of the pool, when exposed to a high irradiation level produced by the nuclear fuel assemblies in a boric acid solution.

The first consequence of this deterioration of the neutrophage material is a reduction in the neutron protection initially provided by it. Beyond a certain use time, it is consequently no longer possible to maintain the initial storage density.

The second disadvantage of the dissolving of the neutrophage material in the water of the pool is the excessive pollution of the cooling circuit water. After a certain period use, said pollution reaches unacceptable limits under normal conditions.

When this situation occurs at present in storage racks equipped with such a neutrophage material, the only known solution consists of replacing the complete rack.

DESCRIPTION OF THE INVENTION

The invention specifically relates to a process for permitting the renovation of a storage rack where a neutrophage material, initially placed between the partitions of the cells and plates joined to said walls, is progressively dissolved in the water of the pool, without it being necessary to completely replace the rack.

According to the invention, this result is achieved by means of a process for the renovation of a nuclear fuel assembly storage rack, which comprises juxtaposed cells defined by bulkheads, whereof at least some have a neutrophage material sheet placed between a partition and a plate joined by welding to said partition, the process being characterized in that it comprises the following steps:

cutting the plates in the vicinity of their welds to the partitions, removal of the neutrophage material sheets and putting into place of new neutrophage material sheets against the partitions.

In a preferred embodiment of the invention, the plates are cut by water jet. This procedure has the advantages of permitting an excellent control of the cutting depth, of having a high productivity, of not polluting the rack and of being easily adaptable to different types of existing racks, as a result of the reduced overall dimensions of the water jet cutting heads.

In order to bring about an optimum control of the cutting depth and consequently not deteriorating the partition placed behind the neutrophage material sheet, the plates are preferably cut in several passes.

To this end, it is either possible to perform successive passes with the aid of the same water jet cutting nozzle, or to perform several successive passes with the aid of a tool equipped with several water jet cutting nozzles, acting on ever greater depths.

In another embodiment, of the invention, the plates are cut by chipping or chiselling.

In all cases, one solution for not deteriorating the partition consists of only carrying out a partial cut on a portion of the thickness of the plate.

There are then advantageously two juxtaposed cuts, defining between them a plate tongue, which is removed by pulling off.

In practice, the plates can be cut parallel to a longitudinal direction of the cells with the aid of a first tool and perpendicular to said same direction with the aid of a second tool.

In order to remove the neutrophage material sheets, as a function of the particular case, it is possible to use a pulling or a scraping tool, permitting the disengagement of any neutrophage material residues left on the partitions.

The new neutrophage material sheets or plates, such as boron steel plates can be fixed directly between the residual portions of the plates, after they have been cut.

If it is so wished, it is also possible to precede the putting into place of the new neutrophage material sheets by a cutting off of the residual portions of the plates, carried out by means of a random, appropriate tool such as a water jet tool.

BRIEF DESCRIPTION OF THE DRAWINGS

The invention is described in greater detail hereinafter relative to non-limitative embodiments and with reference to the attached drawings, wherein show.

DETAILED DESCRIPTION OF PREFERRED EMBODIMENTS

Figure 1:
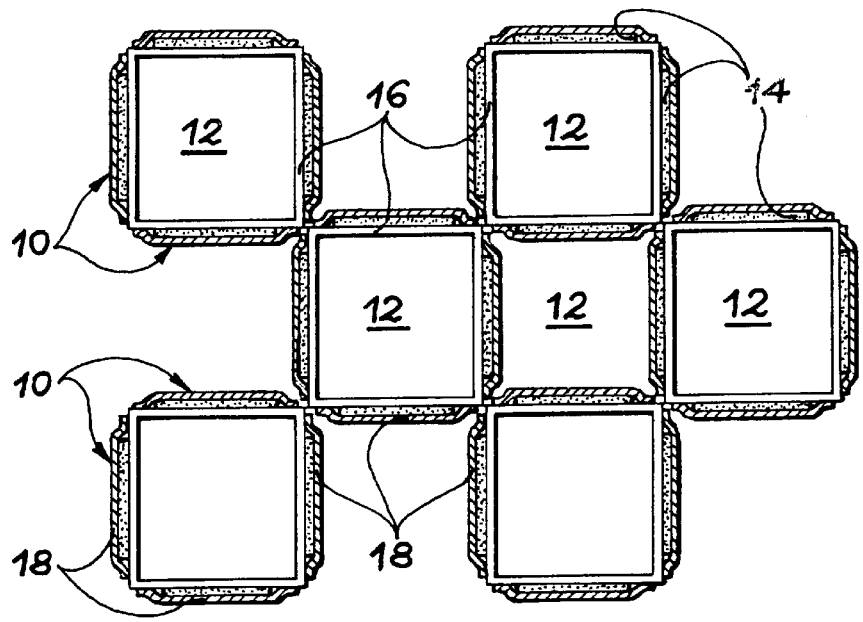
FIG. 1 A plan view diagrammatically representing, in cross-section an example of a storage rack which can be renovated by the process according to the invention.

FIG. 1 shows in exemplified manner a small portion of a nuclear fuel assembly storage rack, to which the renovation process according to the invention can be applied.

Essentially, said rack comprises a rigid structure formed from substantially planar, vertical bulkheads 10 defining between them cavities or cells 12 having a square section. Each of said cells 12 receives a single nuclear fuel assembly. Each cell 12 has a longitudinal axis perpendicular to the plane of FIG. 1 and which is normally vertically oriented when the rack is placed in a pool.

As shown in FIG. 1, the renovation process according to the invention applies to the case where the bulkheads 10 comprise a neutrophage material sheet 14 placed between a partition 16 (e.g. 2 to 3 mm thick) and a thin plate 18 (e.g. approximately 0.8 mm thick) joined by welding to the partition 16.

In this arrangement, the partition 16 forms the rigid structure of the bulkhead 10, which ensures the physical separation between neighbouring cells 12.

In the embodiment illustrated in FIG. 1, the partitions 16 are constituted by the faces of a tube assembly having a square section, assembled in staggered manner by means of not shown, welded linking tabs.

In other types of racks, to which the renovation process according to the invention can also apply, the partitions 16 are constituted by two series of parallel plates, arranged at right angles to one another, so as to form the cells 12.

Figure 2:
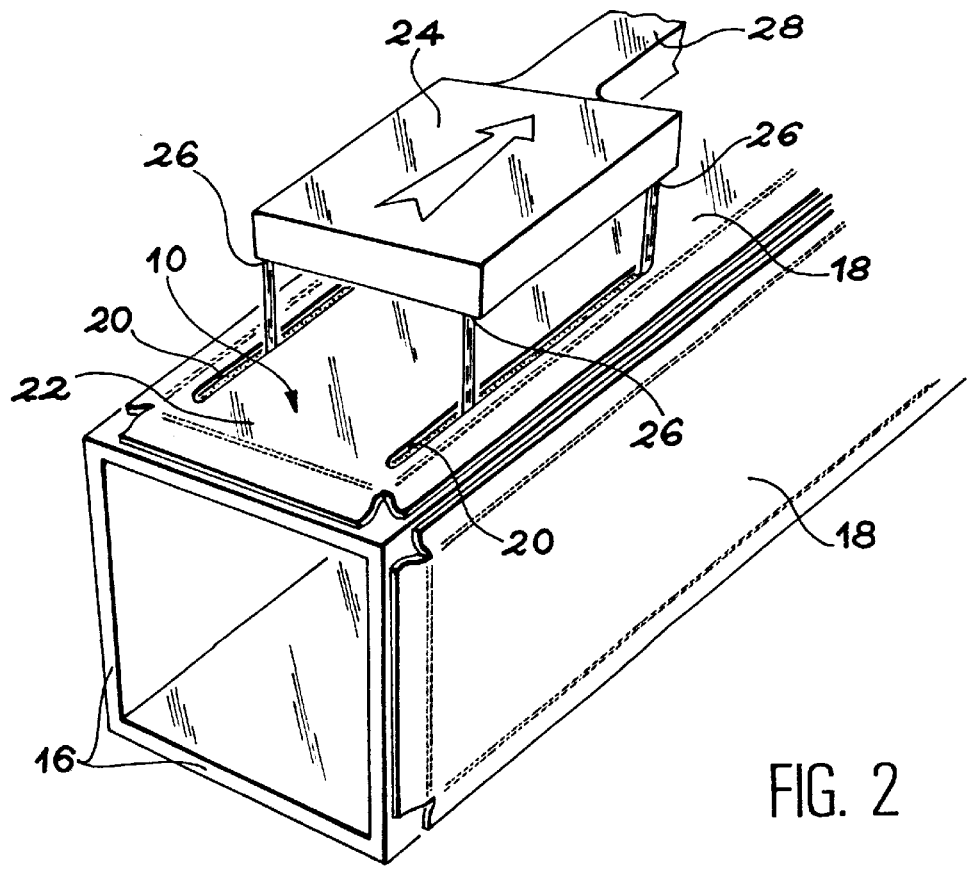
FIG. 2 A perspective view showing the cutting of the plates with the aid of a tool equipped with several water jet cutting nozzles.

In the embodiment illustrated in FIGS. 1 and 2, the neutrophage material sheets 14 are placed on the outer faces of tubes forming the partitions 16. However, the installation of the neutrophage material sheets can also take place in the reverse manner within tubes forming the partitions 16, or in alternating manner in the inside and outside of said tubes, without passing beyond the scope of the invention.

In the same way, when the rigid structure of the rack is formed by an assembly of intersecting plates, the renovation process according to the invention applying no matter to which faces of these plates are joined the neutrophage material sheets.

The neutrophage material sheets 14 are polymer sheets filled with natural boron. A material of this type is known under the trademark Boraflex.

The neutrophage material sheets 14 are rectangular sheets, whose dimensions are slightly smaller than those of the partitions 16 on which said sheets are held by the plates 18. This dimensioning makes it possible to turn down the edges of the plates 18 against the partitions 16, beyond the neutrophage material sheets 14, in order to weld said edges to the partitions, so as to hold the neutrophage material sheets.

As illustrated on a larger scale in FIG. 2, the plates 18 are joined by welding to the partitions 16 in a non-tight manner. Consequently the neutrophage material sheets 14 are permanently in contact with the boric acid solution of the pool.

By hypothesis, the renovation process according to the invention applies to a storage rack which has been in use for several years, where the neutrophage material sheets 14 have been exposed to a high irradiation level in the boric acid solution of the pool containing the rack, for a relatively long period. The neutrophage material sheets 14 in contact with the pool water are then partly dissolved in the latter.

This dissolving effect has the consequence of on the one hand reducing the neutron protection between the adjacent cells 12 and on the other the pollution of the water of the pool cooling circuit.

At present, the only solution for obviating such ageing problems consists of replacing the complete storage rack.

The invention proposes renovating the rack, after removing it from the pool and preferably placing it in a horizontal position.

For this purpose, the plates 18 are firstly cut in the vicinity of their weld to the partitions 16, in order to free the neutrophage material sheets 14 trapped beneath said plates 18.

Bearing in mind the elongated, rectangular shape of each of the bulkheads 10, i.e. both the neutrophage material sheets 14, the partitions 16 and the plates 18, a rectangular cut is made along two longitudinal cutting lines 20 (FIG. 2) and along two transverse cutting lines (not shown). As illustrated in FIG. 2, the longitudinal cutting lines 20 extend parallel to the longitudinal direction of the cells 12 and are as close as possible to the longitudinal edges of the plate 18 welded to the partition 16.

In a comparable manner, the transverse cutting lines 22 are oriented perpendicular to the longitudinal direction of the cells 12 and as close as possible to the welded, terminal edges of the plate 18. These transverse welding lines 22 are consequently close to the top and bottom ends of the racks.

Figure 3:
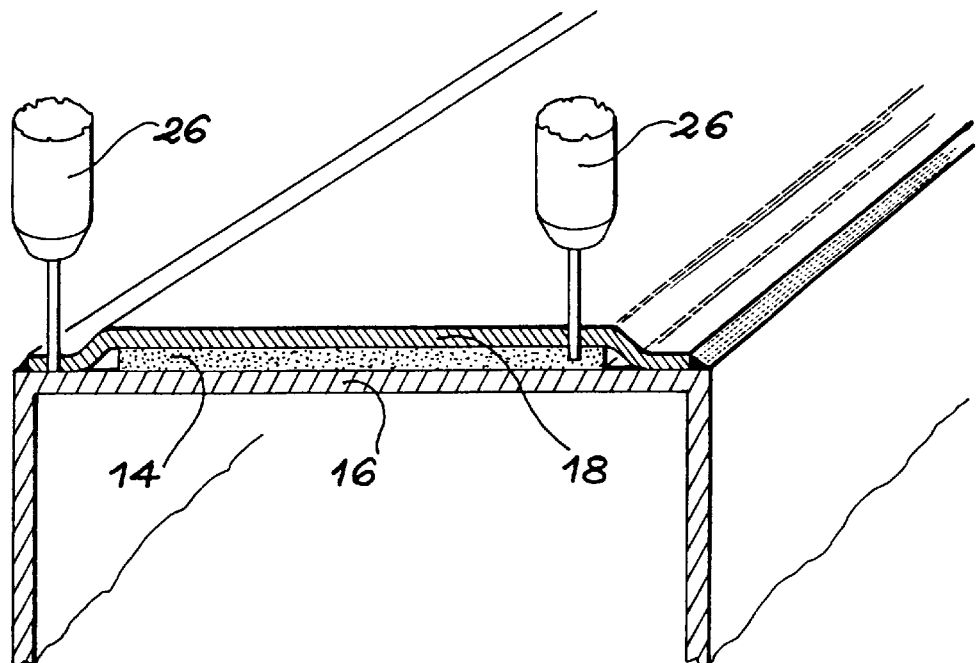
FIG. 3 A perspective view illustrating two examples for the cutting of the entire thickness of a plate.

More specifically and as shown respectively to the left and right of FIG. 3, the cutting of plate 18 can take place either directly in the edge welded to the partition 16, or in the portion of plate 18 adjacent to said edge, but removed from the partition 16 by the thick ness of the sheet 14. The latter method facilitates the cutting of the plate 18 without any risk of damaging the partition 16. However, it also makes it more difficult to remove the sheet 14 and put into place a new neutron protection sheet.

The means used for cutting the plates 18 are chosen in such a way as to limit the risks of the partitions 16 being damaged during this operation. Therefore, advantageously the cutting of the plate 18 takes place by water jet.

In a first embodiment of the invention, water jet cutting preferably takes place in several successive passes, so as to perfectly control the depth of cut. This result can be obtained with the aid of the same water jet cutting nozzle, which is made to travel several times over the same trajectory corresponding to the cutting lines 20 and 22.

As is diagrammatically illustrated in FIG. 2, the same result can be obtained by means of a tool 24 equipped with several water jet cutting nozzles 26. FIG. 2 shows a tool 24 fitted at the end of an arm 28, which moves parallel to the longitudinal axis of the cells, so as to produce each of the longitudinal cutting lines 20 by means of two pairs of water jet cutting nozzles 26. In this case, another, not shown water jet cutting tool is used for making the transverse cutting lines. It should be noted that the number of cutting nozzles 26 used for producing each cutting line 20 can exceed two, if this is required by the cutting depth precision.

In addition, the tool 24 can be constructed in a substantially different way. In exemplified manner, it can be a power tool, guided by a rail extending over the entire length of the cell 12.

Figure 4:
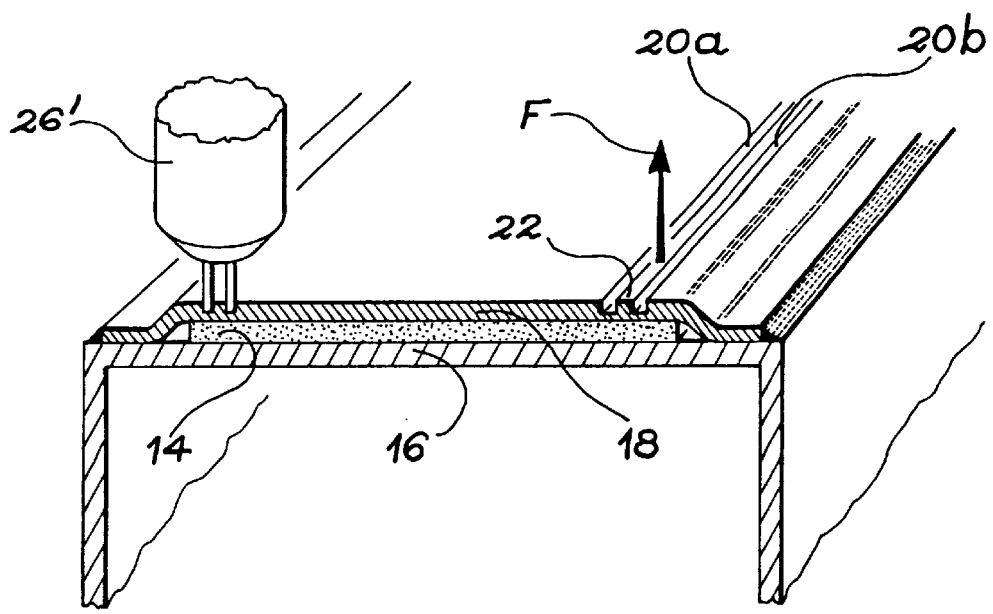
FIG. 4 A view comparable to FIG. 3, illustrating the cutting of a plate over a portion of its thickness, in accordance with two parallel, juxtaposed cutting lines.

In a second embodiment of the invention, diagrammatically illustrated in FIG. 4, insisted of being cut over its entire thickness, the plate 18 is only cut over a portion of said thickness.

More specifically, a water jet cutting nozzle 26' then performs two juxtaposed, parallel cuts, along two cutting lines such as 20a and 20b in FIG. 4. The tongue 22 of the plate 18 located between these two cutting lines is then pulled off, as symbolized by the arrow F. This second embodiment of the invention makes certain that the partition 16 remains intact following the cutting of the plate.

It should be noted that the use of the water jet cutting method offers advantages other than the precise control of the cutting depth. These advantages include a greater productivity, an absence of pollution of the rack, which can then be easily cleaned, and reduced overall dimensions of the cutting head, permitting the adaptation thereof to different types of existing racks.

Following the cutting of the plate 18, the cut portion is removed, which gives access to the neutrophage material sheet 14 initially placed beneath said plate.

This is followed by the removal of said neutrophage material sheet 14. This removal can take place with the aid of any appropriate tool, such as a pulling or scraping tool. The residues of neutrophage material remaining on the partition 16 are in this way detached.

New neutrophage material sheets or plates, e.g. of boron steel, are then put into place on the partition 16, in order to give the rack its original neutron protection characteristics.

These new neutrophage material sheets are preferably placed in the elongated rectangle defined within the residual edge portions of the plates 18. They can be fixed by not shown, joined tongues welded to the residual edge portions of the plates, or by one of the methods to be described hereinafter relative to FIGS. 5 and 6.

Figure 5:
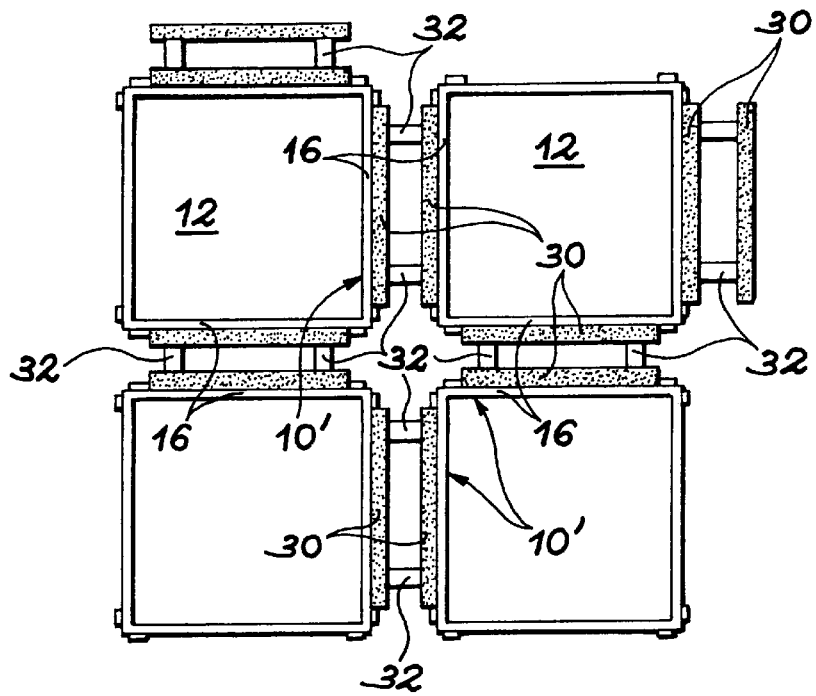
FIG. 5 An example of maintaining new neutrophage material sheets in a storage rack for new assemblies.

FIG. 5 relates to the case of a rack to be used for the storage of new assemblies. In this case, the cells 12 are separated by bulkheads 10', which in each case comprise two partitions 16 belonging to two different tubes defining two adjacent cells 12. The two partitions 16 of the same bulkhead 10' are then separated by an adequate distance for each of them to be initially equipped with a neutrophage material sheet 14, held on its outer face by a welded plate 18, as described hereinbefore.

FIG. 5 shows the rack following the cutting of the plates 18, the removal of of the sheets 14 and the replacement thereof by new neutrophage material plates 30. In this case, the holding of the plates or sheets 30 is ensured by spacing shims 32 inserted between said plates.

Figure 6:
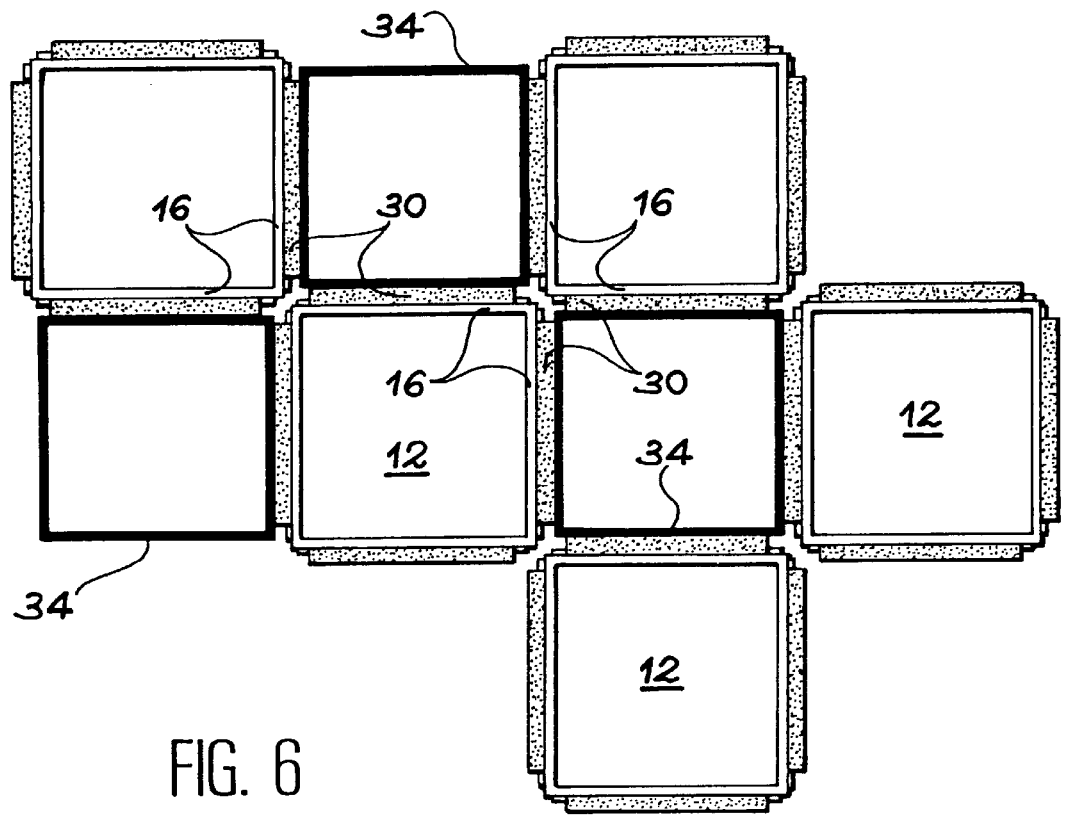
FIG. 6 An example of maintaining new neutrophage material sheets in a storage rack for irradiated assemblies.

FIG. 6 relates to the case of a rack for the storage of used assemblies. This rack is identical to that described hereinbefore relative to FIG. 1. It is shown here following the cutting of the plates 18, removal of the neutrophage material sheets 14 and the replacement of the latter by new, neutrophage material plates 30. In this case, the plates 30 are held by tubes 34 of limited thickness (e.g. 0.5 or 0.8 mm) in cells 12 formed between the tubes defining the partitions 16.

If required by the characteristics of the new neutrophage material sheets, their putting into place can be preceded by an operation of cutting off the residual edge portions of the plates 18. This cutting off operation can take place with the aid of any appropriate tool, such as a water jet tool, a shearing tool, etc.

The neutrophage material plates are then fixed to the thus levelled or smoothed partitions 16 using any of the aforementioned means.

It should be noted that the nature of the new neutrophage material sheets put into place in the rack can be of a random nature, as a function of the rack type.

When the rack has been renovated, said rack can again be used under conditions identical to those present on using a new rack. However, the cost of renovation is much lower than that imposed by the complete replacement of the rack.

In another embodiment of the invention, the total or partial cutting of the plates 18 takes place by chipping or chiselling.

We claim:

1. Process for the renovation of a nuclear fuel assembly storage rack, which comprises juxtaposed cells defined by bulkheads, whereof at least some of said bulkheads include a partition, a plate welded to said partition, and a neutrophage material sheet placed between said partition and said plate, the process comprising the following stages:

cutting the plates in the vicinity of their welds to the partitions, removal of the neutrophage material sheets and putting into place of new neutrophage material sheets against the partitions.

2. Process according to claim 1, wherein the plates are cut by water jet.

3. Process according to claim 2, wherein the plates are cut in several passes.

4. Process according to claim 3, wherein successive passes are performed with the aid of the same water jet cutting nozzle.

5. Process according to claim 3, wherein successive passes are performed with the aid of a tool equipped with several water jet cutting nozzles.

6. Process according to claim 1, wherein the plates are cut by chiselling or chipping.

7. Process according to claim 2, wherein the plates are cut over a portion of their thickness.

8. Process according to claim 7, wherein two juxtaposed cuts are made, defining between them a plate tongue and the latter is removed by pulling off.

9. Process according to claim 1, wherein the plates are cut parallel to a longitudinal direction of the cells with the aid of a first tool and perpendicular to said direction with the aid of a second tool.

10. Process according to claim 1, wherein the neutrophage material sheets are removed by means of a pulling or scraping tool.

11. Process according to claim 1, wherein residual plate portions remaining after the plates are cut are cut off before the new neutrophage material sheets are put into place.

12. Process according to claim 11, wherein the residual plate portions are cut off by means of a water jet tool.

13. Process according to claim 1, where the new neutrophage material sheets are fixed between residual portions of the plates remaining after the plates are cut.

* * * * *

UNITED STATES PATENT AND TRADEMARK OFFICE
CERTIFICATE OF CORRECTION

PATENT NO. : 6,061,414
DATED : May 9, 2000
INVENTOR(S) : Kopecky et al.

It is certified that error appears in the above-identified patent and that said Letters Patent is hereby corrected as shown below:

<u>Title page, Section [56],</u>
References Cited, after "U.S. PATENT DOCUMENTS, 5, 479,463 12/1995 Roberts......376/339" insert
-- FOREIGN PATENT DOCUMENTS
    FR 2357038 A  1/1978  France
    FR 2404284 A  4/1979  France
    DE 3702250 C  7/1988  Germany
    FR 2709995 A  3/1995  France --
References Cited, OTHER PUBLICATIONS, insert
-- Patent Abstracts of Japan, Publicaction Number
    07084094, Publication Date 3/31/1995, Application
    Date September 12, 1993, Application Number
    05251120, applicant: Kawasaki Heavy Ind. Ltd.
-- Patent Abstracts of Japan, Publication Number
    09101391, Publication Date 4/15/1997, Application
    Date 2/10/1995, Application Number 07255238,
    Applicant: Mitsubishi Heavy Ind. Ltd. --

UNITED STATES PATENT AND TRADEMARK OFFICE
CERTIFICATE OF CORRECTION

PATENT NO. : 6,061,414
DATED : May 9, 2000
INVENTOR(S) : Kopecky et al.

It is certified that error appears in the above-identified patent and that said Letters Patent is hereby corrected as shown below:

Column 1,
Line 23, delete "stricture" and insert -- structure --.

Column 5,
Line 60, delete "of of" and insert -- of --.

Signed and Sealed this

Seventh Day of August, 2001

Attest:

*Nicholas P. Godici*

NICHOLAS P. GODICI
*Attesting Officer*        *Acting Director of the United States Patent and Trademark Office*